United States Patent
Stepanek et al.

(10) Patent No.: US 10,728,158 B2
(45) Date of Patent: Jul. 28, 2020

(54) ON-BOX BEHAVIOR-BASED TRAFFIC CLASSIFICATION

(71) Applicant: Cisco Technology, Inc., San Jose, CA (US)

(72) Inventors: Michael Joseph Stepanek, Fulton, MD (US); Costas Kleopa, Clarksville, MD (US); David McGrew, Poolesville, MD (US); Blake Harrell Anderson, San Jose, CA (US); Saravanan Radhakrishnan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/379,352

(22) Filed: Apr. 9, 2019

(65) Prior Publication Data
US 2019/0238471 A1 Aug. 1, 2019

Related U.S. Application Data

(63) Continuation of application No. 15/353,940, filed on Nov. 17, 2016, now Pat. No. 10,305,809.

(51) Int. Cl.
| | |
|---|---|
| *H04L 12/851* | (2013.01) |
| *H04L 12/825* | (2013.01) |
| *H04L 12/859* | (2013.01) |
| *H04L 12/931* | (2013.01) |
| *H04L 29/06* | (2006.01) |
| *H04W 12/12* | (2009.01) |

(52) U.S. Cl.
CPC ...... *H04L 47/2441* (2013.01); *H04L 47/2475* (2013.01); *H04L 47/2483* (2013.01); *H04L 47/25* (2013.01); *H04L 49/355* (2013.01); *H04L 63/0254* (2013.01); *H04L 63/0428* (2013.01); *H04L 63/1425* (2013.01); *H04L 63/1458* (2013.01); *H04L 63/166* (2013.01); *H04W 12/12* (2013.01)

(58) Field of Classification Search
None
See application file for complete search history.

(56) References Cited

U.S. PATENT DOCUMENTS

| | | | |
|---|---|---|---|
| 8,151,348 B1* | 4/2012 | Day | H04L 63/1408 709/224 |
| 8,839,404 B2 | 9/2014 | Li et al. | |
| 9,258,217 B2 | 2/2016 | Duffield et al. | |
| 9,288,220 B2 | 3/2016 | Raugas | |
| 2016/0028750 A1 | 1/2016 | Di Pietro et al. | |
| 2016/0028763 A1 | 1/2016 | Cruz Mota et al. | |
| 2016/0080363 A1* | 3/2016 | Taboso | H04L 63/0823 713/156 |

* cited by examiner

*Primary Examiner* — Kent Krueger
(74) *Attorney, Agent, or Firm* — Behmke Innovation Group LLC; James M. Behmke; Jonathon P. Western (57) ABSTRACT

In one embodiment, a networking device in a network detects a traffic flow conveyed in the network via the networking device. The networking device generates flow data for the traffic flow. The networking device performs a classification of the traffic flow using the flow data as input to a machine learning-based classifier. The networking device performs a mediation action based on the classification of the traffic flow.

17 Claims, 8 Drawing Sheets

… …
ON-BOX BEHAVIOR-BASED TRAFFIC CLASSIFICATION

RELATED APPLICATION

The present application is a Continuation Application of U.S. patent application Ser. No. 15/353,940, filed Nov. 17, 2016, entitled ON-BOX BEHAVIOR-BASED TRAFFIC CLASSIFICATION, by Michael Joseph Stepanek et al., the contents of which is hereby incorporated by reference

TECHNICAL FIELD

The present disclosure relates generally to computer networks, and, more particularly, to on-box behavior-based traffic classification.

BACKGROUND

Malicious or otherwise undesirable network traffic can take many different forms. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, a further type of malicious network traffic includes network traffic that propagates the malware itself. Additionally, some network traffic may simply be deemed inappropriate for a particular network.

Intrusion prevention systems (IPS), next-generation firewalls, and flow monitoring systems generally attempt to detect and block malicious traffic, whenever possible. However, in recent years, the amount of encrypted and evasive network traffic has increased considerably. Notably, with the advent of transport layer security (TLS) and other security mechanisms, many websites are now encrypting even traditional webpage data. This presents certain challenges to traditional security systems as the contents of the traffic may not be available for analysis and pattern matching is generally inapplicable to encrypted traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a networking device in a network detects a traffic flow conveyed in the network via the networking device. The networking device generates flow data for the traffic flow. The networking device performs a classification of the traffic flow using the flow data as input to a machine learning-based classifier. The networking device performs a mediation action based on the classification of the traffic flow.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
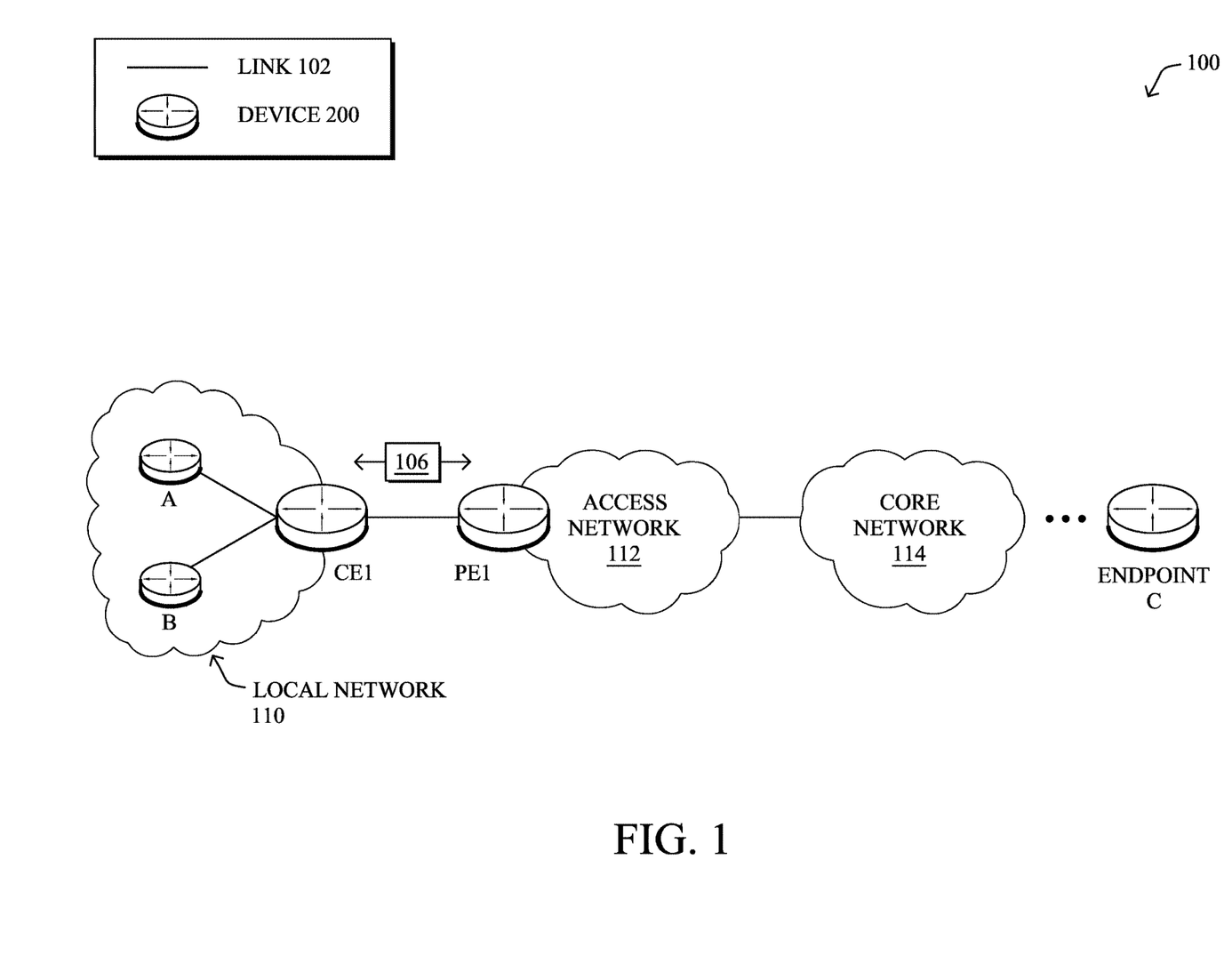
FIG. 1 illustrate an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

Figure 2:
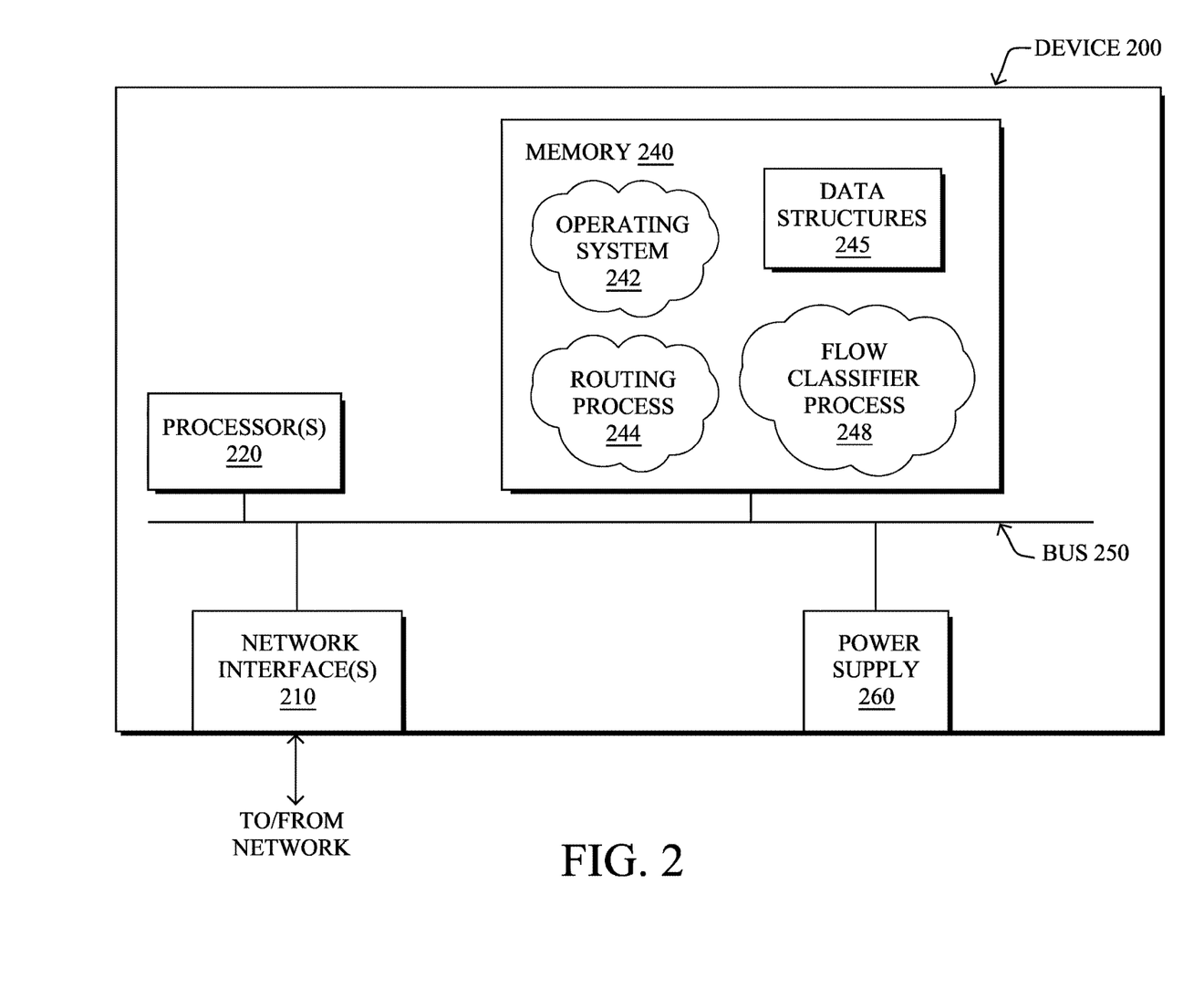
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and, illustratively, a flow classifier process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), the Routing Protocol for Low-Power and Lossy Networks (RPL), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Flow classifier process 248 may include executable instructions that, when executed by processor(s) 220, cause device 200 to classify traffic flows. In some embodiments, flow classifier process 248 may make a determination as to whether a given traffic flow/session is malicious. For example, flow classifier process 248 may determine whether a given flow/session is related to malware (e.g., by conveying malware, is generated by malware, etc.).

In various embodiments, flow classifier process 248 may execute one or more machine learning-based classifiers to classify traffic flows. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, flow classifier process 248 can use the model M to classify new data points, such as information regarding new traffic flows in the network. Often, M is a statistical model, and the cost function is inversely proportional to the likelihood of M, given the input data.

Example machine learning techniques that flow classifier process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

As noted above, security systems such as intrusion detection systems (IDS), intrusion prevention systems (IPS), next-generation firewalls (NGFW), and the like, may attempt to detect malicious traffic flows at the network edge, in some implementations. This allows these systems to perform deep packet inspection (DPI), application identification, etc., on communications between a local host and a remote host. For example, a security system at the network edge can capture packets between local host A and a remote host C, to protect the integrity of the local network from outside attacks (e.g., by preventing malware from entering the local network). Additionally, a network administrator may be interested in monitoring specific applications that are running on the network and may wish to control which network applications are allowed through.

To detect malware and other malicious traffic, security systems implemented at the network edge typically rely on: 1.) packet capture/analysis (e.g., DPI) and 2.) pattern matching techniques. However, both techniques may not be applicable to encrypted traffic, presenting a new threat to networks. While it may be possible to employ an encryption proxy that acts as a man-in-the-middle and is able to decrypt the traffic, such an approach may be difficult to implement, may be unsavory to users that want some privacy, and may even be prohibited by law in some areas.

Further challenges to edge-located security mechanisms include evasive applications and internal network traffic. Notably, some applications now employ evasive techniques to avoid detection by avoiding the use of well-known ports and IP addresses. In addition, propagation of malware internal to the network (e.g., via east-west traffic, peer-to-peer traffic, etc.) may not traverse the edge-located security mechanism. While it may be possible to pass internal traffic information to the security mechanism, doing so would also increase the overhead of the network and consume additional network resources.

On-Box Behavior-Based Traffic Classification

The techniques herein propose that a networking device that observes a traffic flow (e.g., a switch, router, IPS, etc.) also analyzes the flow using one or more on-box behavior-based classifiers. This allows for a distributed defense system throughout the network that can detect the presence of malware and other malicious traffic, and take corrective measures, accordingly. By using a machine learning-based classifier, the executing device may be able to detect and classify malicious traffic that would otherwise escape detection using techniques such as pattern matching. The classifier(s) can be updated as needed by a supervisory device or autonomous by the device itself. In some cases, the device may dynamically select which classifier(s) to use, based on the characteristics of the traffic and parameters of the classifier(s). Since the detection is performed in-line, as opposed to after the fact, the device can also take mitigation actions in real time, such as blocking or dropping malicious traffic as it occurs.

Specifically, according to one or more embodiments of the disclosure as described in detail below, a networking device in a network detects an traffic flow conveyed in the network via the networking device. The networking device generates flow data for the traffic flow. The networking device performs a classification of the traffic flow using the flow data as input to a machine learning-based classifier. The networking device performs a mediation action based on the classification of the traffic flow.

Illustratively, the techniques described herein may be performed by hardware, software, and/or firmware, such as in accordance with the flow classifier process 248, which may include computer executable instructions executed by the processor 220 (or independent processor of interfaces 210) to perform functions relating to the techniques described herein, e.g., in conjunction with routing process 244.

Figure 3A:
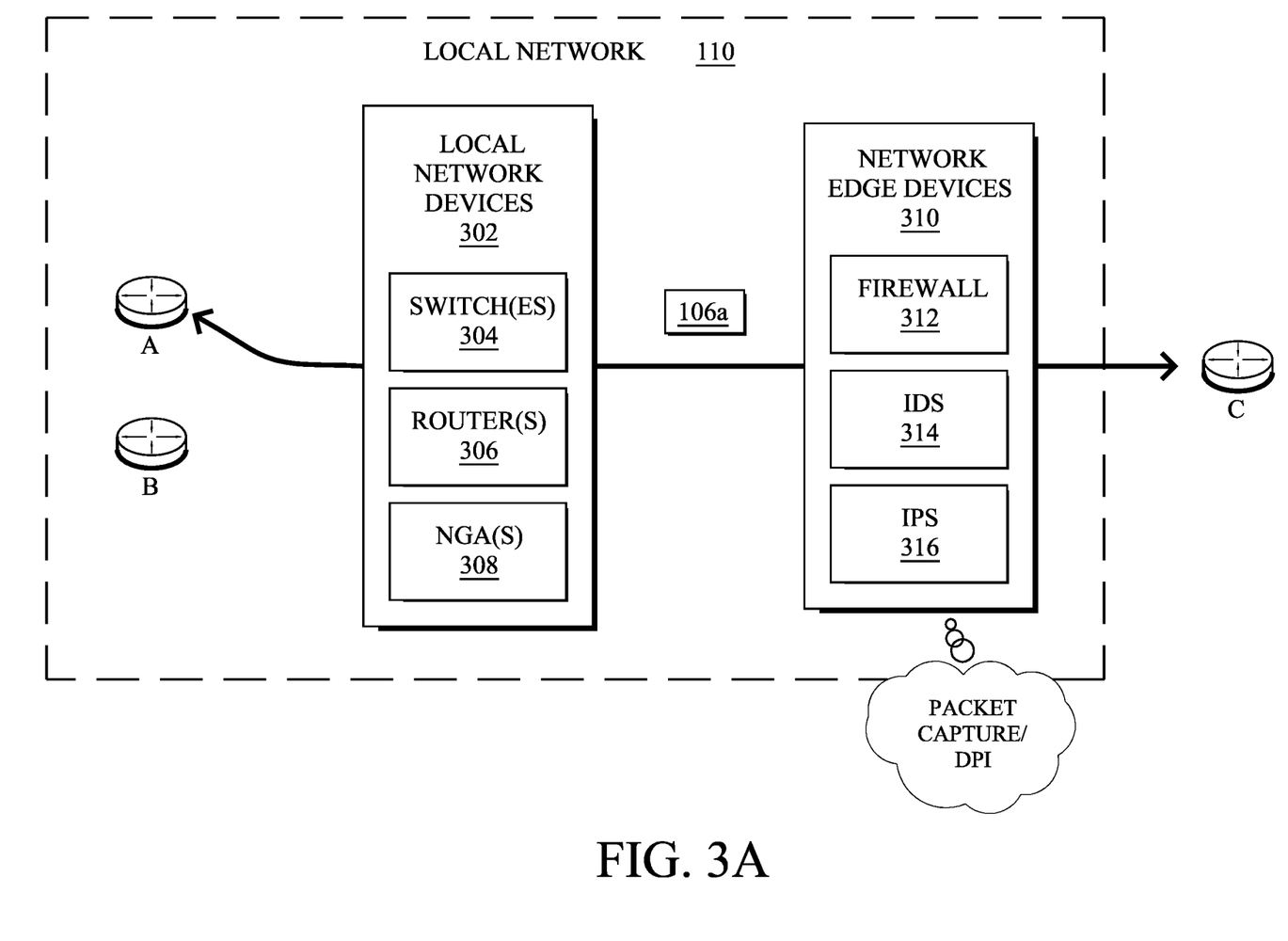
FIGS. 3A-3D illustrate examples of a device performing traffic classification.

Operationally, FIGS. 3A-3D illustrate examples of a device performing traffic classification, according to various embodiments. As shown in FIG. 3A, local network 110 may include any number of local networking devices 302 that are in communication with any number of network edge devices 310. For example, local networking devices 302 may include, but are not limited to, any number of switches 304, any number of routers 306, traffic data collection appliances such as Netflow™ Generation Appliances (NGAs) 308 from Cisco Systems, Inc., or other networking devices that are located internal to local network 110 and not on the edge of local network 110. Similarly, network edge devices 310 may include security devices such as a firewall 312, an IDS 314, an IPS 316, or the like, that are located on the edge of local network 110. Network edge devices 310 may further include outward-facing networking devices, such as one or more edge routers (e.g., CE1 shown in FIG. 1).

In some embodiments, network edge devices 310 may assess incoming and outbound traffic for local network 110, to protect against malicious traffic. For example, assume that client device A in local network 110 exchanges traffic/packets 106a with remote device C, which is external to local network 110. In such a case, network edge devices 310 may assess traffic/packets 106a, to determine whether traffic/packets 106a are malicious. For example, network edge devices 310 may capture samples of traffic/packets 106a and perform DPI and pattern matching, to determine whether the samples are indicative of a known type of malware. However, such techniques may not be available if traffic/packets 106a are encrypted.

Figure 3B:
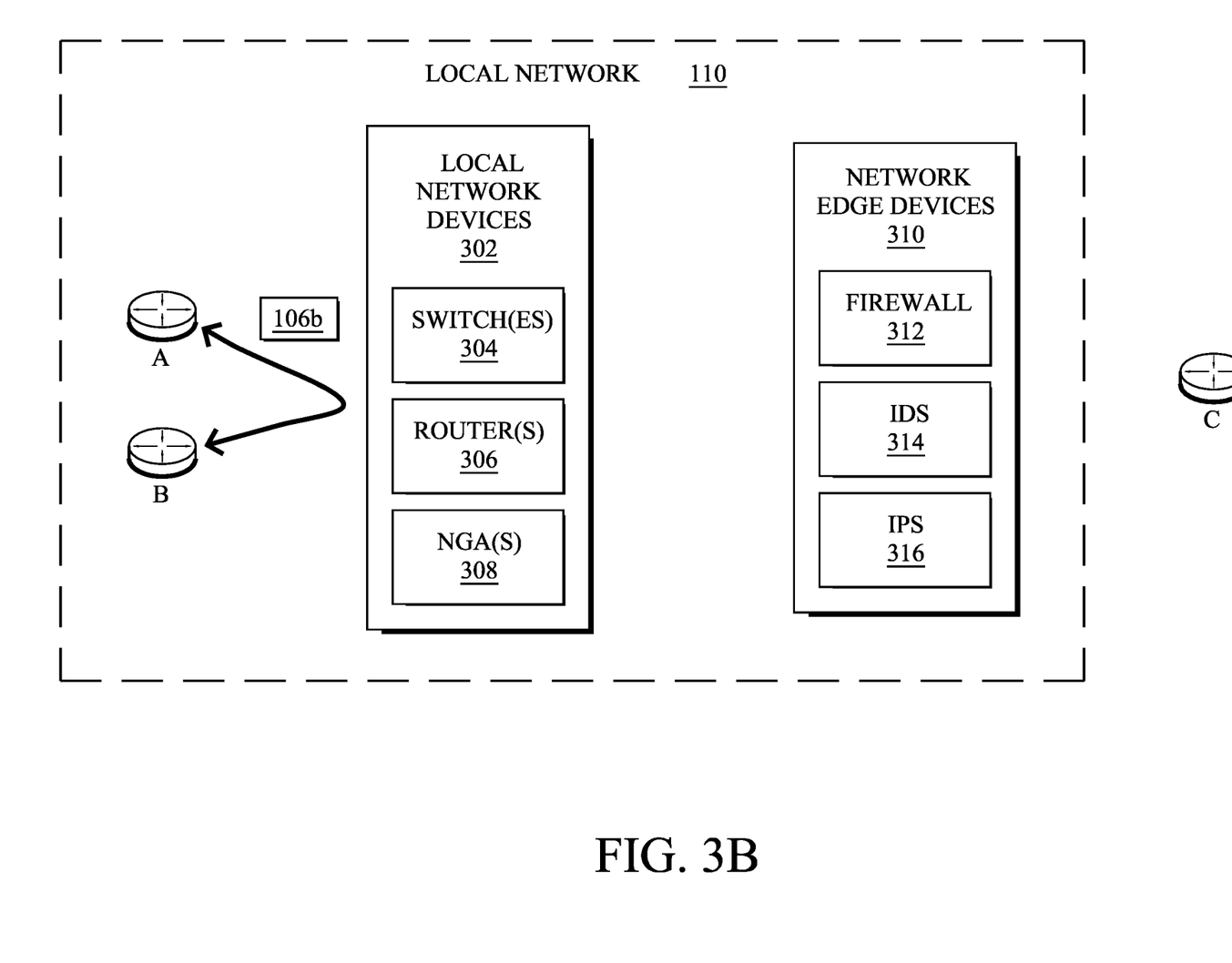

As shown in FIG. 3B, and noted above, some situations may entail the propagation of malicious traffic within local network 110 itself. For example, assume that client device A is infected with malware and attempts to infect other client devices in the local network 110, such as client device B, via traffic/packets 106b. Such traffic, sometimes also known as east-west traffic would not typically propagate up to the network edge of local network 110, but would instead be processed directly by local networking devices 302. For example, if client devices A and B are on the same switch 304 or router 306, traffic/packets 106b may be conveyed within local network 110 outside of the purview of the security mechanisms in network edge devices 310.

Figure 3C:
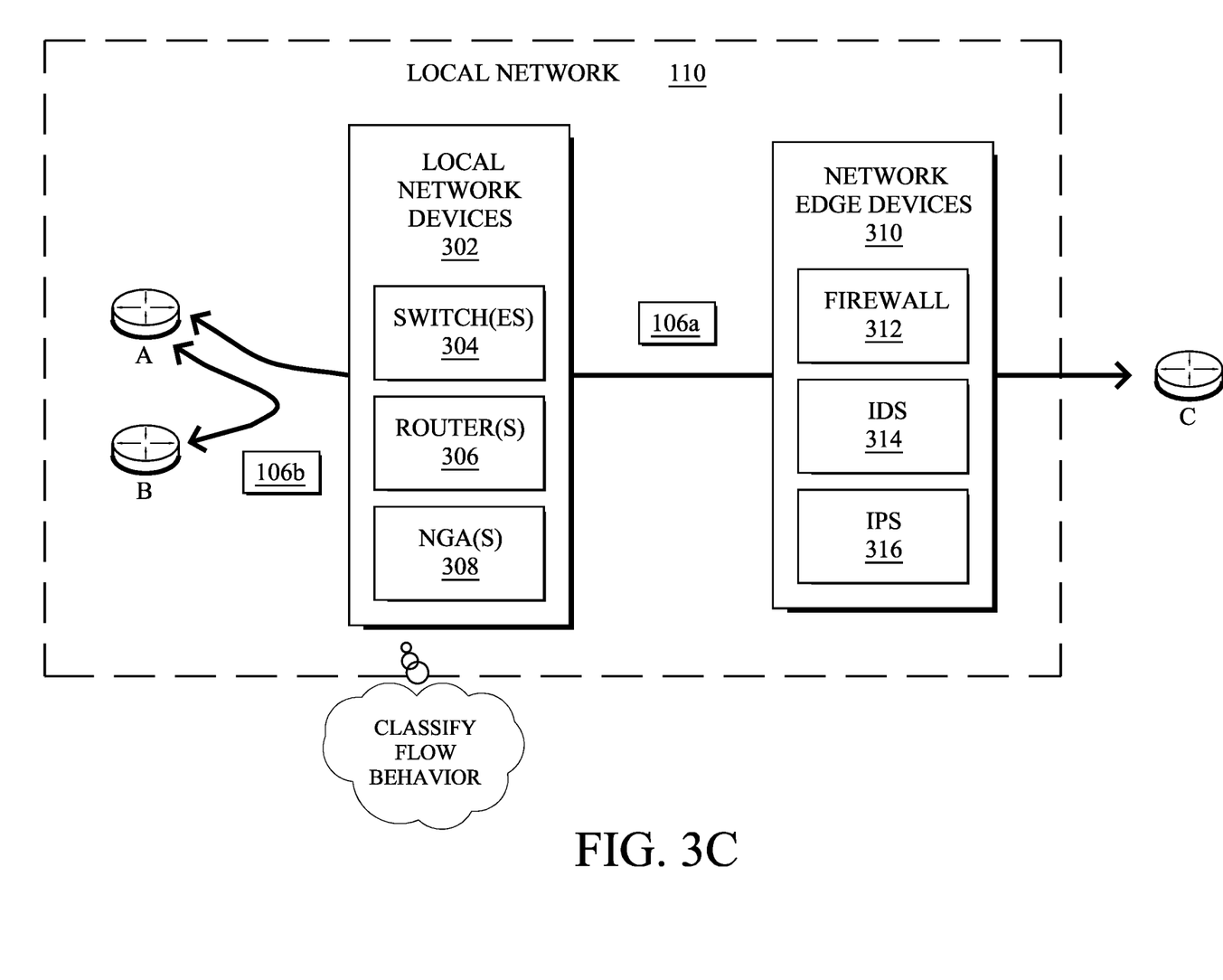

According to various embodiments, as shown in FIG. 3C, rather than performing full anomaly or malware detection, local networking devices 302 may be configured to classify traffic directly on the device that sees the traffic. For example, one or more of local networking devices 302 may observe either or both of traffic/packets 106a-106b, as the traffic flows through the networking device. From this observation, the device may generate behavioral flow data that characterizes the behavior of the traffic flow, which may be of particular use when the flow is encrypted and DPI, etc. are unavailable. For example, the networking device 302 may generate sequence of packet lengths and time (SPLT) data regarding the traffic flow, sequence of application lengths and time (SALT) data regarding the traffic flow, byte distribution (BD) data regarding the traffic flow, or any other behavioral flow data that characterizes the behavior of the encrypted traffic flow. The flow-derived features for the machine learning-based classifier could also include, but is not limited to, the above features. For example, other flow-derived features could even include metadata derived from a secure socket layer (SSL) session.

In turn, the networking device 302 may use the behavioral traffic flow data as input to one or more machine learning-based classifier, in real-time, to determine a classification score for the traffic. This allows the device 302 to detect malware and/or an application associated with the traffic, using score thresholding. Note that this differs from unsupervised anomaly detection techniques that rely on learning a (statistical) model of "normal" network behavior to detect abnormal network behavior. Instead, the classifier may be trained using sample data to determine a classification score for network traffic indicative of how malicious or suspicious the traffic is. The training data and derived classifiers could also target a particular type of network application of interest.

Figure 3D:
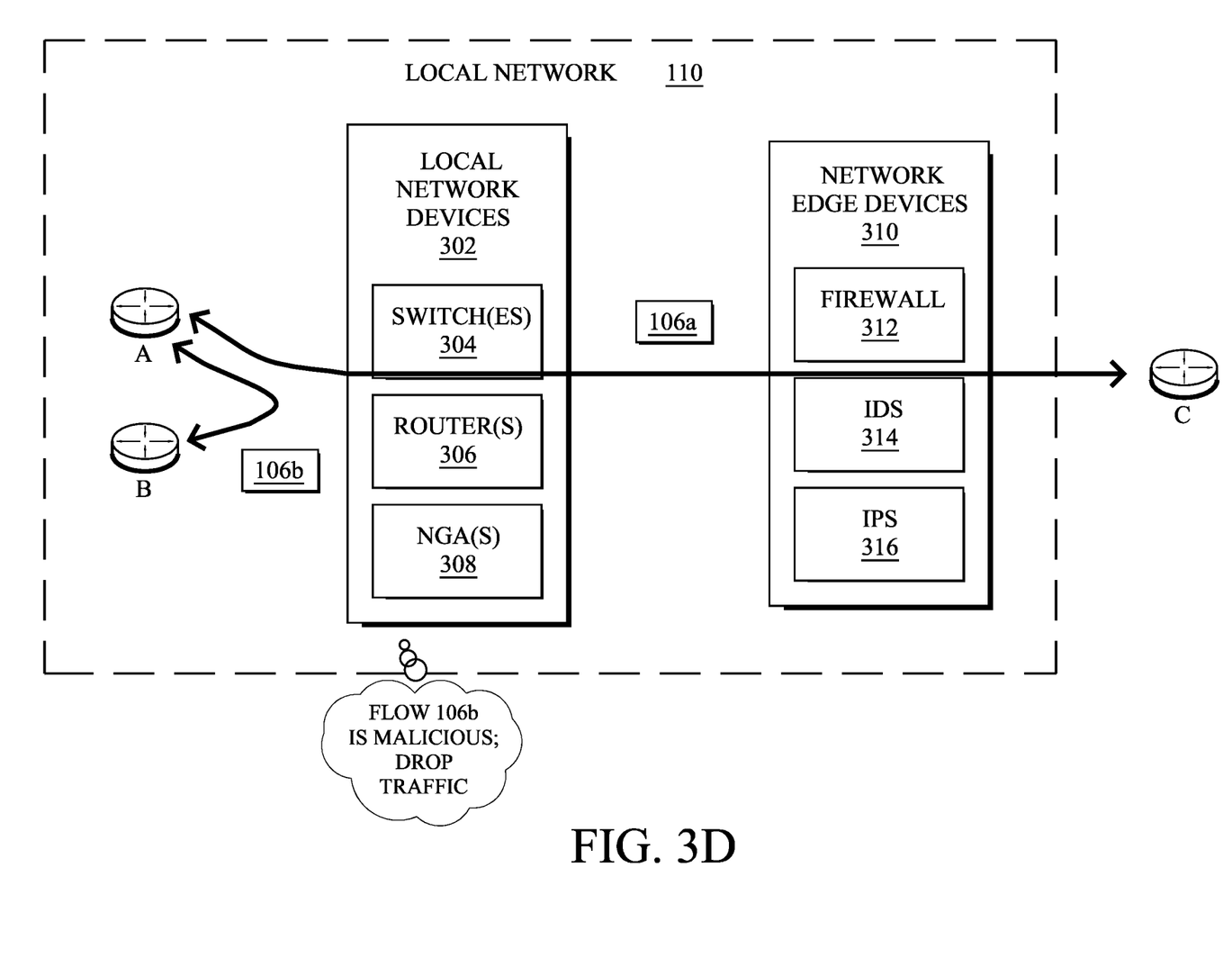

As shown in FIG. 3D, if the local networking device 302 determines that any of the assessed packets/traffic flows are malicious (e.g., have a classification score above a given threshold), the device may take any number of mitigation actions. For example, based on the classification results, the device 302 may generate user alerts/reports, initiate corrective measures such as by implementing active access/intrusion controls (e.g., blocking undesired/malicious traffic), or the like. In another embodiment, based on the resulting score of these classifiers, the device 302 may decide to block the classified network flow from proceeding, in order to protect the network (e.g., by dropping or otherwise blocking the packets of the flow). The mitigation actions may also be a function of the classification scores, allowing the device 302 to select a mitigation action based on the classification of the flow. Other mitigation actions may include, but are not limited to, applying more powerful analytics to other flows from the endpoint(s), signaling a man-in-the-middle approach to intercept and decrypt traffic from an endpoint, or the like. In further embodiments, the on-box classification and mitigation techniques herein may be performed by any of network edge devices 310.

In some cases, the device 302 may fuse the classification results (e.g., classification score, threshold, etc.) with other data, to implement one or more IPS or access control (AC) rules. For example, if a malware classifier results in a high score (i.e., likely malicious or suspicious), and the source and destination IP addresses cross nation/continent boundaries, then a compound rule may cause the device 302 to block the traffic (e.g., as opposed to simply generating an alert, if the traffic only has a high classifier score). A security research group or network administrator could write such a compound rule to fuse a possibly weak conviction by a classifier with other factors (e.g., other traffic statistics, the IP addresses involved, etc.), since it is based on statistics and not absolutes, to form a stronger conviction and take a stronger stance on the traffic (e.g., by blocking the traffic instead of simply generating an alert).

Figure 4A:
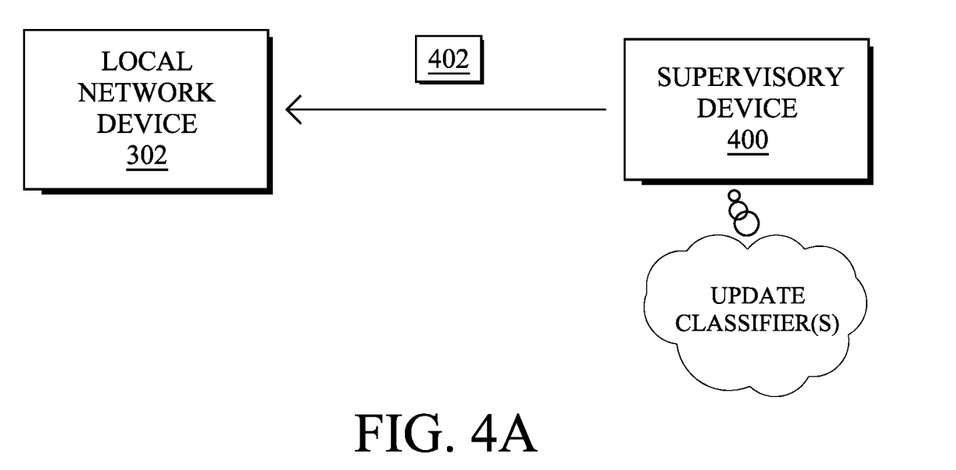
FIGS. 4A-4B illustrate examples of a supervisory device providing supervisory control over a traffic classifier.
Figure 4B:
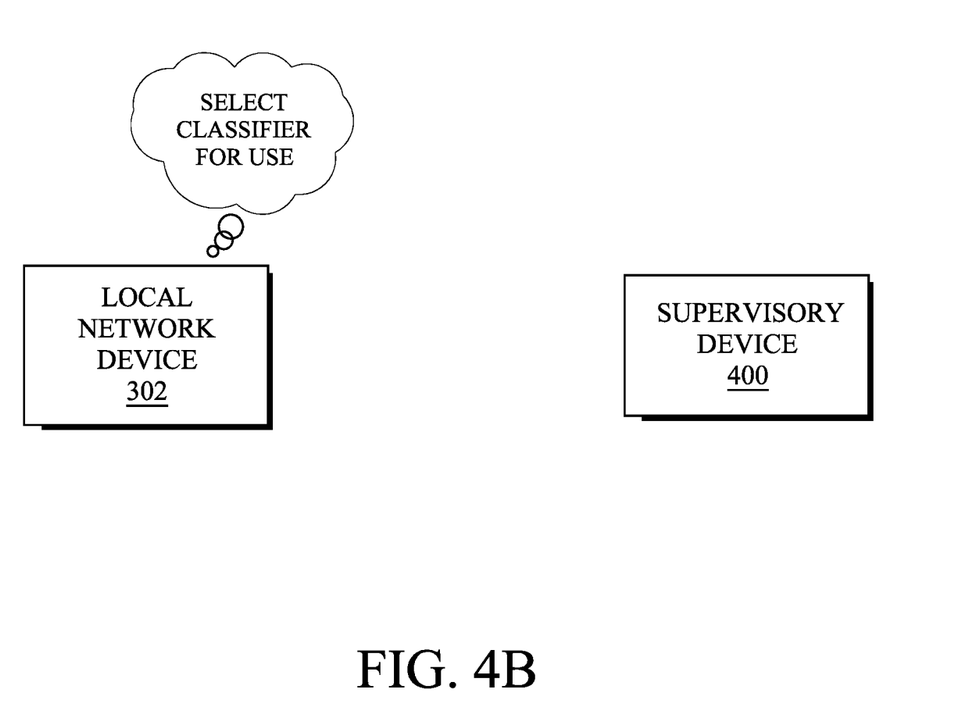

FIGS. 4A-4B illustrate examples of a supervisory device providing supervisory control over a traffic classifier, according to various embodiments. As shown, the local networking device 302 may be in communication with a supervisory device 400, which may or may not be resident to local network 110. For example, supervisory device may be an application policy infrastructure controller (APIC), developer server, cloud-based, etc.

In various embodiments, supervisory device 400 may send control data 402 to local networking device 302 periodically, in response to a user request, during an authorized time window, or at any other time. In some embodiments, control data 402 may include parameter updates for the classifier(s) executed by local networking device 302. For example, supervisory device 400 may publish nightly classifier parameter updates from fresh, re-learned data, to keep local networking device 302 up-to-date with the latest threats/applications. For example, supervisory device 400 may employ a malware pack distribution technique, to detect malware (e.g., including behavioral signatures), relay classifier parameters, and possibly define associated actions to take.

In some cases, an analytics engine, which may be separate from supervisory device 400, may generate the set of malware/application packs in control data 402 based on the outcome from the machine learning processes. In turn, supervisory device 400 may receive the updates from the analytics engine and distribute the malware packs to local networking device 302 (e.g., a switch, router, etc.). Supervisory device 400 may also control the frequency of the updates to local networking device 302 (e.g., to minimize the impact of the updates on the network, etc.).

In a further example, the continually updated malware packs and/or classifier parameters of control data 402 may be updated by a cloud based service. In such cases, supervisory device 400 may be an IPS, firewall, or the like, that can pull fresh classifier signatures and parameters periodically or at will from the service. In turn, supervisory device 400 may control the local distribution of control data 402 to local networking device 302. This would allow for easy (and automated) updates to catch new malware, e.g., 0-day malware, on live networks.

As shown in FIG. 4B, a further aspect of the techniques herein provides for local networking device 302 to host multiple traffic classifiers. In some embodiments, local networking device 302 may then select between the classifiers for use, based on the observed flow statistics. For example, local networking device 302 may only assess network traffic using a SALT+BD classifier for higher fidelity, if local networking device 302 has observed more than N-number of bytes of traffic. Otherwise, local networking device 302 may instead use a SALT-only classifier to assess the traffic, since the BD data for the traffic may not be complete enough.

Figure 5:
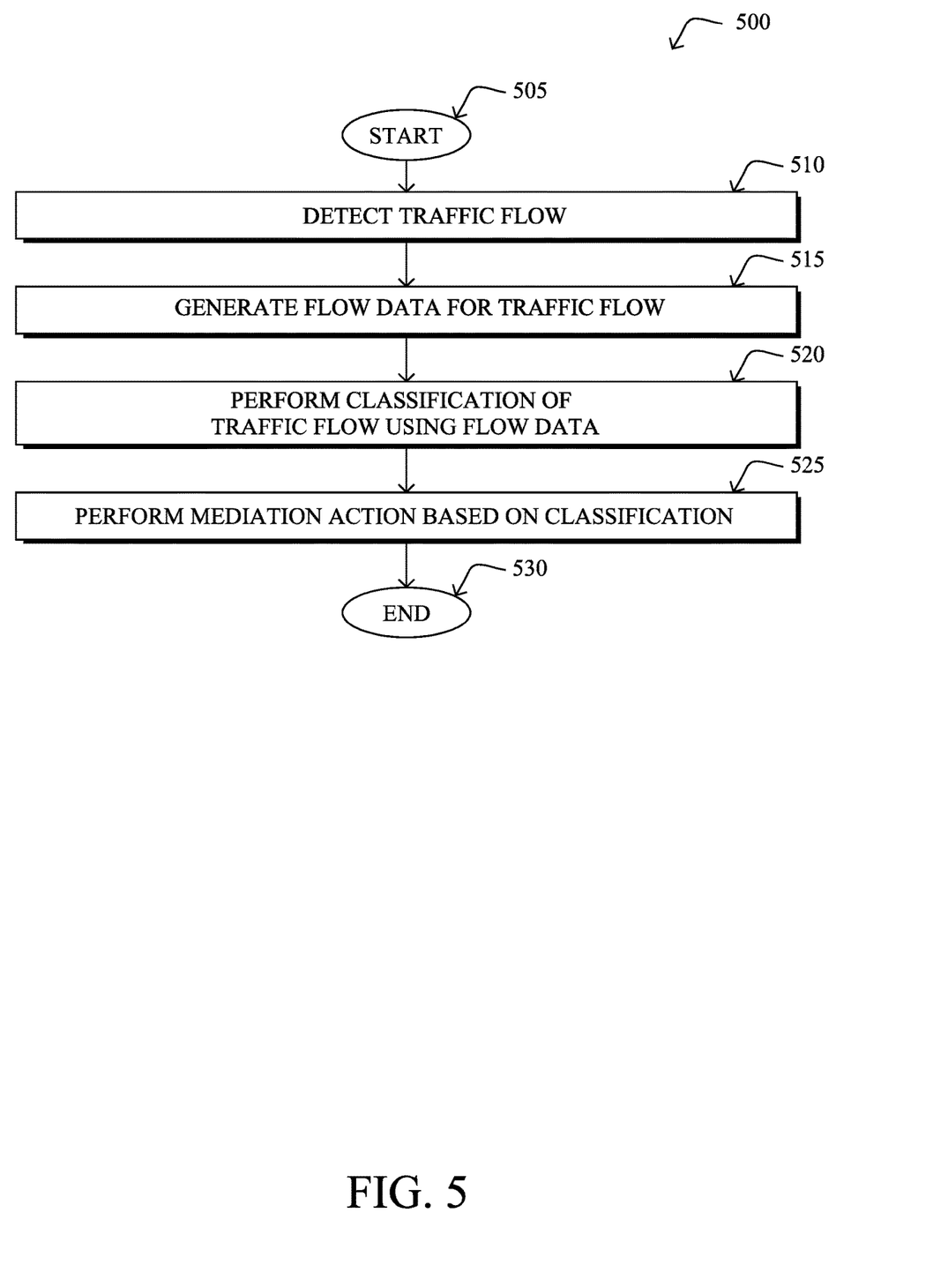
FIG. 5 illustrates an example simplified procedure for performing on-box behavior-based traffic classification.

FIG. 5 illustrates an example simplified procedure for performing on-box behavior-based traffic classification in a network, in accordance with one or more embodiments described herein. For example, a non-generic, specifically configured networking device (e.g., device 200) may perform procedure 500 by executing stored instructions (e.g., process 248). The procedure 500 may start at step 505, and continues to step 510, where, as described in greater detail above, the networking device may detect an encrypted traffic flow conveyed in the network via the networking device. For example, the networking device may be a switch, router, IPS, NGFW, etc., through which the detected traffic flows.

At step 515, as detailed above, the networking device may generate traffic flow data for the traffic flow. Generally, the flow data may be any data, statistics, metrics, etc., that characterize the detected flow (e.g., header metadata, observed characteristics, etc.). In some embodiments, for example, the traffic flow data may include one or more of: sequence of packet lengths and time (SPLT) data regarding the traffic flow, sequence of application lengths and time (SALT) data regarding the traffic flow, byte distribution (BD) data regarding the traffic flow, SSL-based metadata regarding the traffic flow, TLS-based metadata regarding the traffic flow, or any other flow-derived features from the traffic flow.

At step 520, the networking device may perform a classification of the traffic flow using the flow data, as described in greater detail above. For example, the classifier may use the SALT, BD, etc., flow data regarding the flow, as input to one or more machine learning-based classifiers configured to assess whether or not the traffic flow is malicious, undesired, or simply of interest (e.g., associated with certain applications). Note that many of these flow-related features may be used to classify unencrypted and/or encrypted traffic, in various cases. In other words, the classification may be agnostic to whether the traffic is encrypted or not.

At step 525, as detailed above, the networking device may perform a mediation action based on the classification of the traffic flow in step 520. Notably, if the classification indicates that the traffic flow is malicious or suspicious, the networking device may take steps to mediate/mitigate the effects of the flow. For example, the networking device may generate an alert (e.g., to a user interface or other networking system), block or drop the traffic, reroute the traffic, or take any other steps needed to address the traffic. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a distributed defense mechanism in the network that can assess observed network traffic on-box using one or more local classifier(s) that are both robust and dynamic (e.g., up-to-date). By deploying such techniques deeper in the network (e.g., to routers, switches, etc.), such a device may also perform the corresponding mediation actions when it detects malicious traffic (e.g., by dropping the traffic, etc.). Further, the techniques herein can be applied to the analysis of traffic flows, which have proven difficult to assess in many networks.

While there have been shown and described illustrative embodiments that provide for the on-box classification of network traffic, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    detecting, at a networking device in a network, a traffic flow conveyed in the network via the networking device, wherein the traffic flow is encrypted;
    generating, by the networking device, behavioral flow data for the traffic flow;
    selecting, by the networking device, a machine learning-based classifier among a plurality of machine learning-based classifiers hosted by the networking device, wherein the selecting of the machine learning-based classifier is based on one or more characteristics of the behavioral flow data and one or more respective parameters of the plurality of machine learning-based classifiers;
    after selecting the machine learning-based classifier among the plurality of machine learning-based classifiers;
    performing, by the networking device, a classification of the traffic flow using the behavioral flow data as input to the selected machine learning-based classifier;
    performing, by the networking device, a first mediation action when the classification of the traffic flow satisfies a threshold; and
    performing, by the networking device, a second mediation action different from the first mediation action when the classification of the traffic flow satisfies the threshold and at least one other feature of the traffic flow satisfies a predefined condition.

2. The method as in claim 1, wherein the behavioral flow data comprises one or more of: Transport Layer Security (TLS) metadata or Secure Socket Layer (SSL) metadata.

3. The method as in claim 1, wherein the behavioral flow data comprises one or more of: sequence of packet lengths and time (SPLT) data regarding the traffic flow, sequence of application lengths and time (SALT) data regarding the traffic flow, or byte distribution (BD) data regarding the traffic flow.

4. The method as in claim 1, wherein the selected machine learning-based classifier is selected based in part on a number of bytes or packets of the traffic flow observed by the networking device.

5. The method as in claim 1, further comprising: receiving, at the networking device, an adjustment to the selected machine learning-based classifier from a supervisory device.

6. The method as in claim 1, wherein the first or second mediation action comprises blocking the traffic flow or raising an alert.

7. The method as in claim 1, wherein the networking device is internal to the network and in communication with one or more network edge devices located on an edge of the network.

8. An apparatus, comprising:
    one or more network interfaces to communicate with a network;
    a processor coupled to the network interfaces and configured to execute one or more processes;
    and a memory configured to store a process executable by the processor, the process when executed operable to:
        detect a traffic flow conveyed in the network via the apparatus, wherein the traffic flow is encrypted;
        generate behavioral flow data for the traffic flow; select a machine learning-based classifier among a plurality of machine learning-based classifiers hosted by the networking device, wherein the selecting of the machine learning-based classifier is based on one or more characteristics of the behavioral flow data and one or more respective parameters of the plurality of machine learning-based classifiers;
        after selecting the machine learning-based classifier among the plurality of machine learning-based classifiers;
        perform a classification of the traffic flow using the behavioral flow data as input to a machine the selected machine learning-based classifier;
        perform a first mediation action when the classification of the traffic flow satisfies a threshold; and
        perform a second mediation action different from the first mediation action when the classification of the traffic flow satisfies the threshold and at least one other feature of the traffic flow satisfies a predefined condition.

9. The apparatus as in claim 8, wherein the apparatus is a network router or a network switch.

10. The apparatus as in claim 8, wherein the behavioral flow data comprises one or more of: sequence of packet lengths and time (SPLT) data regarding the traffic flow, sequence of application lengths and time (SALT) data regarding the traffic flow, or byte distribution (BD) data regarding the traffic flow.

11. The apparatus as in claim 8, wherein the selected machine learning-based classifier is selected based in part on a number of bytes or packets of the traffic flow observed by the apparatus.

12. The apparatus as in claim 8, wherein the process when executed is further operable to: receive an adjustment to the selected machine learning-based classifier from a supervisory device.

13. The apparatus as in claim 8, wherein the first or second mediation action comprises blocking the traffic flow or raising an alert.

14. A tangible, non-transitory, computer-readable medium storing program instructions that cause a networking device in a network to execute a process comprising:
   detecting, at the networking device, a traffic flow conveyed in the network via the networking device, wherein the traffic flow is encrypted;
   generating, by the networking device, behavioral flow data for the traffic flow; selecting, by the networking device, a machine learning-based classifier among a plurality of machine learning-based classifiers hosted by the networking device, wherein the selecting of the machine learning-based classifier is based on one or more characteristics of the behavioral flow data and one or more respective parameters of the plurality of machine learning-based classifiers;
   after selecting the machine learning-based classifier among the plurality of machine learning-based classifiers;
   performing, by the networking device, a classification of the traffic flow using the behavioral flow data as input to the selected machine learning-based classifier;
   performing, by the networking device, a first mediation action when the classification of the traffic flow satisfies a threshold; and
   performing, by the networking device, a second mediation action different from the first mediation action when the classification of the traffic flow satisfies the threshold and at least one other feature of the traffic flow satisfies a predefined condition.

15. The computer-readable medium as in claim 14, wherein the networking device is a network router or a network switch.

16. The computer-readable medium as in claim 14, wherein the behavioral flow data comprises one or more of: sequence of packet lengths and time (SPLT) data regarding the traffic flow or byte distribution (BD) data regarding the traffic flow.

17. The computer-readable medium as in claim 14, wherein the selected machine learning-based classifier is selected based in part on a number of bytes or packets of the traffic flow observed by the networking device.

* * * * *